(12) United States Patent
Chung et al.

(10) Patent No.: US 8,926,874 B2
(45) Date of Patent: Jan. 6, 2015

(54) POROUS MANGANESE OXIDE ABSORBENT FOR LITHIUM HAVING SPINEL TYPE STRUCTURE AND A METHOD OF MANUFACTURING THE SAME

(75) Inventors: Kang-Sup Chung, Daejeon (KR); Tae Gong Ryu, Daejeon (KR); Byoung Gyu Kim, Daejeon (KR); Jung Ho Ryu, Daejeon (KR)

(73) Assignee: Korea Institute of Geoscience and Mineral Resources (KIGAM), Daejeon (KR)

( * ) Notice: Subject to any disclaimer, the term of this patent is extended or adjusted under 35 U.S.C. 154(b) by 0 days.

(21) Appl. No.: 13/640,085

(22) PCT Filed: Jun. 26, 2012

(86) PCT No.: PCT/KR2012/005031
§ 371 (c)(1),
(2), (4) Date: Mar. 15, 2013

(87) PCT Pub. No.: WO2013/015531
PCT Pub. Date: Jan. 31, 2013

(65) Prior Publication Data
US 2014/0210122 A1    Jul. 31, 2014

(30) Foreign Application Priority Data
Jul. 22, 2011 (KR) .................. 10-2011-0072917

(51) Int. Cl.
| | | |
|---|---|---|
| B29C 65/00 | (2006.01) | |
| B01J 39/10 | (2006.01) | |
| B01J 20/04 | (2006.01) | |
| B01J 20/06 | (2006.01) | |
| B01J 20/30 | (2006.01) | |
| B01J 20/02 | (2006.01) | |

(52) U.S. Cl.
CPC ....... *B01J 39/10* (2013.01); *B01J 20/04* (2013.01); *B01J 20/06* (2013.01); *B01J 20/3007* (2013.01); *B01J 20/3078* (2013.01); *B01J 20/0222* (2013.01); *B01J 20/041* (2013.01)
USPC ............. 264/42; 264/43; 264/45.1; 264/45.4; 264/45.6; 264/48; 264/50; 264/51; 264/54; 264/55; 264/45.3; 264/413; 264/628; 264/44

(58) Field of Classification Search
USPC .................... 264/42, 44, 45.1, 45.4
See application file for complete search history.

(56) References Cited

U.S. PATENT DOCUMENTS

| | | | |
|---|---|---|---|
| 2008/0032192 A1* | 2/2008 | Yokomizo et al. | ............ 429/210 |
| 2009/0142255 A1* | 6/2009 | Chung et al. | ............... 423/594.2 |

FOREIGN PATENT DOCUMENTS

| | | | |
|---|---|---|---|
| JP | 2535748 | | 3/1994 |
| JP | 06227820 | * | 8/1994 |

(Continued)

OTHER PUBLICATIONS

Kang-Sup Chung et al., "Inorganic adsorbent containing polymeric membrane reservoir for the recovery of lithium from seawater" Journal of Membrane Science (2008), vol. 325, pp. 503-508.

(Continued)

*Primary Examiner* — Jeffrey Wollschlager
*Assistant Examiner* — Stella Yi
(74) *Attorney, Agent, or Firm* — McDonnell Boehnen Hulbert & Berghoff LLP

(57) ABSTRACT

The present invention relates to a porous manganese oxide-based lithium absorbent and a method for preparing the same. The method includes the steps of preparing a mixture by mixing a reactant for the synthesis of a lithium-manganese oxide precursor powder with an inorganic binder, molding the mixture, preparing a porous lithium-manganese oxide precursor molded body by heat-treating the molded mixture, and acid-treating the porous lithium-manganese oxide precursor molded body such that lithium ions of the porous lithium-manganese oxide precursor are exchanged with hydrogen ions, wherein pores are formed in the lithium-manganese oxide precursor molded body by gas generated in the heat treatment. The porous manganese oxide-based lithium adsorbent according to the present invention is easy to handle and has many more adsorption reaction sites compared to existing molded adsorbents, thus providing high lithium adsorption efficiency.

10 Claims, 2 Drawing Sheets

(56) References Cited

FOREIGN PATENT DOCUMENTS

| JP | 4163595 | | 6/2005 |
|----|---------|---|--------|
| KR | 10-2005-0045792 | | 5/2005 |
| KR | 10-0536957 | | 5/2005 |
| KR | 20040010379 | * | 12/2005 |
| KR | 10-2008-0045627 | | 5/2008 |
| KR | 10-0972140 | | 5/2008 |

OTHER PUBLICATIONS

Aya Umeno et al., "Preparation and Adsorptive Properties of Membrane-Type Absorbents for Lithium Recovery from Seawater" Ind. Eng. Chem. Res. (2002), vol. 41, pp. 4281-4287.

Li-Wen Ma et al., "Preparation, characterization and adsorptive properties of foam-type lithium adsorbent" Micropororous and Mesoporous Materials (2010), pp. 1-7.

* cited by examiner

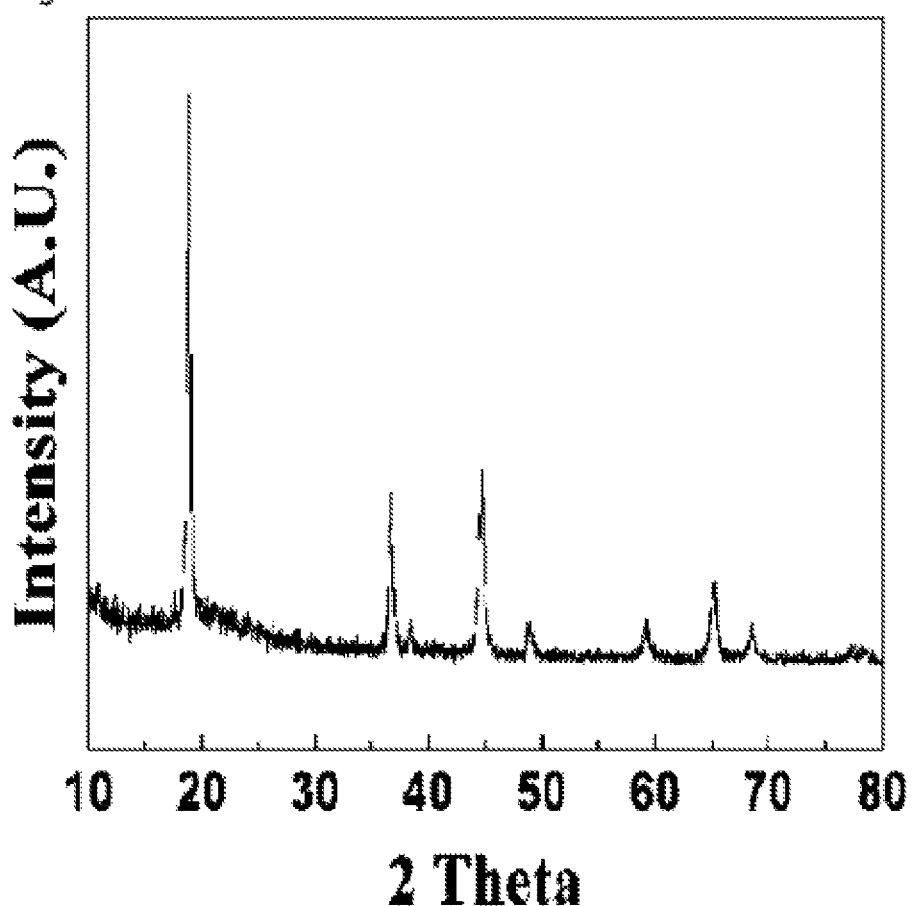

POROUS MANGANESE OXIDE ABSORBENT FOR LITHIUM HAVING SPINEL TYPE STRUCTURE AND A METHOD OF MANUFACTURING THE SAME

TECHNICAL FIELD

The present invention relates to a porous manganese oxide-based lithium adsorbent which selectively adsorbs lithium ions, and a method for preparing the same.

BACKGROUND ART

Lithium and lithium compounds are used in a wide range of fields such as ceramics, secondary battery materials, refrigerant adsorbents, catalysts, medicines, etc. and have attracted attention as nuclear fusion energy resources. If high-capacity batteries, electric vehicles, etc. are commercialized, it is expected that the demand for the lithium and lithium compounds will also increase. When considering that the world's reserves of lithium commercially available are only about 4 million tons at this point, there is an urgent need for developing a new technology for ensuring lithium resources. To this end, extensive studies aimed at efficiently extracting lithium dissolved in a small amount in aqueous solutions such as seawater, bittern, waste fluids of lithium batteries, etc. have continued to progress. The main concern of these studies using lithium adsorbents is to develop a high-performance adsorbent having high selectivity to lithium ions and excellent adsorption and desorption performance.

Conventionally, as a result of these studies, there is known a method for preparing a powder that facilitates adsorption and desorption of lithium by a solid-state reaction or gel process using manganese oxide, and the powder prepared by such a method has been used as a material for a positive electrode for a lithium secondary battery (Korean Patent No. 10-0245808, Korean Patent Publication No. 10-2003-0028447, etc.), a material for a lithium adsorbent, etc. However, the use of a lithium adsorbent in the form of powder in seawater or in a solution where lithium ions are dissolved is inconvenient in handling, and thus it is necessary to mold the powder. As a molding method, Korean Patent Publication No. 10-2003-0009509 discloses a method for preparing an adsorbent in the form of beads by mixing a powder with an alumina powder and agglomerating the mixture of the powder and the alumina powder using a pore-forming agent such as PVC.

Typically, the lithium adsorbent must maintain physical and chemical stability in aqueous solutions in various environments and provide an adsorption site that can ensure high adsorption efficiency. Moreover, the lithium adsorbent must have essential characteristics that can maintain high selectivity to lithium ions that the adsorbent in the form of powder has so as not to adsorb elements other than lithium and facilitate desorption for recovery of lithium after the adsorption. However, when the adsorbent is prepared in the form of beads by the above-described conventional PVC addition method, its handling is easy, but its adsorption capacity is reduced by about 30% compared to the adsorbent in the form of powder, and various problems such as high manufacturing costs, environmental pollution, etc. occur.

DISCLOSURE

Technical Problem

An object of the present invention is to provide a porous ion-exchange manganese oxide-based lithium adsorbent and a method for preparing the same, which is easy to handle, has many more adsorption reaction sites that can selectively react with lithium ions, and is physically and chemically stable.

Technical Solution

To accomplish the above objects of the present invention, there is provided a method for preparing a porous manganese oxide-based lithium adsorbent, the method comprising the steps of: molding by heat-treating a mixture of a lithium-manganese oxide precursor reactant and a binder; and acid-treating the lithium-manganese oxide precursor molded body, wherein in the heat treatment, pores are formed in the lithium-manganese oxide precursor molded body by gas generated by decomposition of the lithium-manganese oxide precursor reactant or the binder.

Moreover, the present invention provides the porous manganese oxide-based lithium adsorbent prepared by the above method, the porous manganese oxide-based lithium adsorbent having a spinel structure and a plurality of pores.

In more detail, the present invention provides a high-performance porous lithium adsorbent molded body and a method for preparing the same, which can selectively adsorb and recover only lithium ions by an ion-exchange method, by uniformly mixing a reactant, which is used for the preparation of a lithium-manganese oxide precursor, with water glass ($M_2OnSiO_2 \cdot xH_2O$, wherein M is an alkali metal such as Na, Li, K, etc., and $0.54 \leq n \leq 4$) and an additive, molding the mixture to form a molded body with pores formed on the inside and outside thereof by heat treatment, and acid-treating the resulting molded body. It is possible to control the size and density of the pores, which are formed on the inside and outside of the molded body according to the feature of the present invention, by controlling the heat treatment time and conditions, if necessary.

Advantageous Effects

The porous manganese oxide-based lithium adsorbent and the method for preparing the same according to the present invention have the following effects.

First, it is possible to provide an ion-exchange manganese oxide-based lithium adsorbent which is easy to handle and has many more adsorption reaction sites compared to the existing adsorbent molded body and so has high lithium adsorption efficiency by molding the ion-exchange manganese oxide-based lithium adsorbent in the form of power into a porous molded body.

Second, it is possible to control the size and density of the pores, which are formed on the inside and outside of the porous manganese oxide-based lithium adsorbent prepared according to the present invention, by controlling the reaction temperature, the reaction time, the amount of additive, etc., during the heat treatment, and thus it is possible to easily control the properties of the lithium adsorbent, if necessary.

Third, the porous manganese oxide-based lithium adsorbent prepared according to the present invention has excellent physical and chemical stability in aqueous solutions in various environments and exhibits high selectivity to lithium ions and thus can be effectively used to selectively adsorb and recover only lithium ions from aqueous solutions such as seawater, bittern, waste fluids of lithium batteries, etc. in which lithium ions are dissolved.

DESCRIPTION OF DRAWINGS

FIG. 2 shows XRD patterns of an adsorbent obtained in Example 5.

BEST MODE FOR CARRYING OUT THE INVENTION

Figure 1:
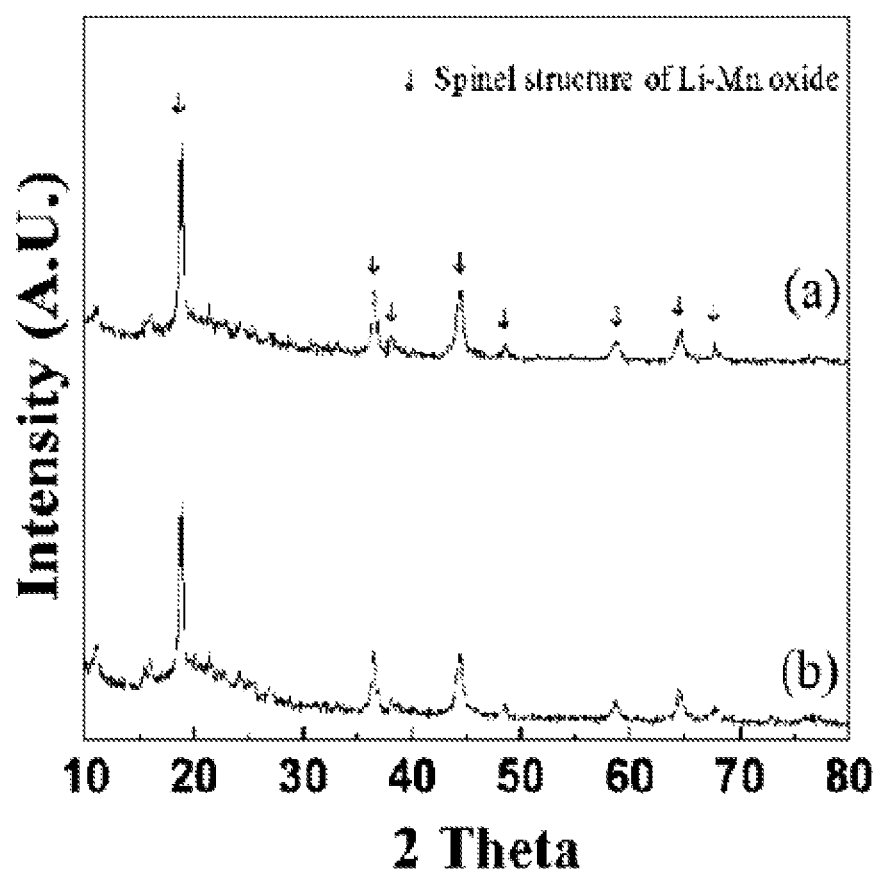
FIG. 1 shows XRD patterns of lithium-manganese oxides obtained in Example 1, in which (a) shows the result of heat treatment for 2 hours, and (b) shows the result of heat treatment for 4 hours.

The foregoing objects, features and advantages of the invention will be more apparent from the following description taken in conjunction with the following drawings.

Specific structural and functional details disclosed herein are merely representative for purposes of describing example embodiments, and the embodiments according to the concept of the present invention may be embodied in many alternate forms and should not be construed as limited to only the embodiments set forth herein.

While the embodiments according to the concept of the present invention are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Although the terms first and/or second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion, e.g., "between" versus "directly between", "adjacent" versus "directly adjacent", etc.

The terminology used herein is for the purpose of describing particular embodiments only and is not intended to be limiting of the invention. As used herein, the singular expression "a", "an" and "the" are intended to include the plural expression as well, unless the context clearly indicates otherwise. It will be further understood that the terms "comprises", "comprising", "includes" and/or "including", when used herein, specify the presence of stated features, integers, steps, operations, elements, components or combinations thereof but do not preclude the presence or addition of one or more other features, integers, steps, operations, elements, components or combinations thereof.

Unless otherwise defined, all terms, including technical and scientific terms, used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to exemplary embodiments.

The present invention has been invented to increase the utilization of an adsorption powder that can selectively adsorb and recover lithium ions contained in an aqueous solution and completed based on the fact that it is possible to prepare a high-performance porous lithium adsorbent molded body, which can selectively adsorb and recover only lithium ions by an ion-exchange method, by uniformly mixing a reactant with water glass ($M_2OnSiO_2xH_2O$, wherein M is an alkali metal such as Na, Li, K, etc., and $0.54 \leq n \leq 4$) and an additive, molding the mixture to form a molded body with pores formed on the inside and outside thereof by heat treatment, and acid-treating the resulting molded body.

The present invention relates to a method for preparing a porous manganese oxide-based lithium adsorbent, the method comprising the steps of preparing a mixture by mixing a reactant for the synthesis of a lithium-manganese oxide precursor powder with water glass, preparing a porous molded body by molding and heat-treating the mixture, and acid-treating the molded body.

Typically, the lithium adsorbent must maintain physical and chemical stability in aqueous solutions in various environments and provide an adsorption site that can ensure high adsorption efficiency. Moreover, the lithium adsorbent must maintain high selectivity to lithium ions so as not to adsorb elements other than lithium and facilitate desorption for recovery of lithium after the adsorption.

In this respect, it is reported that a manganese oxide compound obtained by acid-treating a conventional lithium-manganese oxide precursor having a spinel structure to phase dissolve lithium ions in compounds exhibits excellent selectivity to lithium ions in a target solution.

The lithium-manganese oxide having a spinel structure applicable to the present invention can be applied without any limitation as long as it can be used as a lithium adsorbent by ion-exchange. More preferably, in view of the essential characteristics required for the lithium adsorbent, a lithium-manganese oxide having a spinel structure of the following Chemical Formula 1 among the lithium-manganese oxides having the spinel structure, known as having selective adsorption capacity to lithium ions, is used as a precursor.

$$Li_nMn_{2-x}O_4 \quad \text{[Chemical Formula 1]}$$

wherein $1 \leq n \leq 1.33$, $0 \leq x \leq 0.33$, and $m \leq 1+x$.

The lithium-manganese oxide of Chemical Formula 1 has high chemical stability and, when the lithium-manganese oxide acts as an ion-sieve, it can exhibit selective adsorption capacity to lithium ions and thus can be applied to the present invention as a precursor of the lithium adsorbent.

While the present invention is not limited to the lithium-manganese oxide of Chemical Formula 1, a lithium-manganese oxide of the following Chemical Formula 2 may be preferably used as an ion-exchange precursor.

$$Li_{1.33}Mn_{1.67}O_4 \quad \text{[Chemical Formula 2]}$$

When the ion-exchange precursor of Chemical Formula 2 is used as the lithium adsorbent, it is possible to maximize the lithium adsorption efficiency, facilitate its handling, also facilitate desorption for recovery of lithium after the adsorption.

The ion-exchange precursor of Chemical Formula 2 can adsorb and desorb lithium ions by an ion-exchange method as shown in the following Reaction Scheme 1 and thus can be most preferably used as the porous lithium adsorbent according to the present invention.

$$(Li)[Li_{0.33}Mn(IV)_{1.67}]O_4 \leftrightarrow (H)[H_{0.33}Mn(IV)_{1.67}]O_4 \quad \text{[Reaction Scheme 1]}$$

wherein ( ) represents the 8a tetrahedral site in a spinel structure and [ ] represents the 16d octahedral site in the spinel structure.

Moreover, an example of the ion exchange lithium-manganese oxide that can be suitably applicable to the present invention may include a lithium-manganese oxide of the following Chemical Formula 3.

$$Li_{1.6}Mn_{1.6}O_4 \quad \text{[Chemical Formula 3]}$$

It is known that the lithium-manganese oxide of Chemical Formula 3 has high selective adsorption efficiency to lithium ions.

Furthermore, an example of the ion exchange lithium-manganese oxide that can be suitably applicable to the present invention may include lithium-manganese oxides of the following Chemical Formulas 4 to 6, in which a part of manganese is substituted with a transition metal in the lithium-manganese oxides of Chemical Formulas 1 to 3.

$$Li_nMn_{2-x-y}M_yO_4 \quad \text{[Chemical Formula 4]}$$

wherein $1 \leq n \leq 1.33$, $0 \leq x \leq 0.33$, $n \leq 1+x$, $0 < y < 1.67$, and M is a transition metal.

$$Li_{1.33}Mn_{1.67-y}M_yO_4 \quad \text{[Chemical Formula 5]}$$

wherein $0 < y < 1.67$ and M is a transition metal.

$$Li_{1.6}Mn_{1.6-y}M_yO_4 \quad \text{[Chemical Formula 6]}$$

wherein $0 < y < 1.6$ and M is a transition metal.

A lithium raw material for the synthesis of these lithium-manganese oxides may be selected from the group consisting of lithium carbonate, lithium hydroxide, lithium nitrate, lithium acetate, and combinations thereof. For example, $Li_2CO_3$, $Li_2O$, $LiOH$, etc. may be used as the raw materials.

A manganese law material for the synthesis of these lithium-manganese oxides may be selected from the group consisting of manganese, manganese oxide, manganese hydroxide, and combinations thereof. For example, $MnCO_3$, $MnO_2$, $Mn_2O_3$, $Mn_3O_4$, MnO, etc. may be used as the raw materials Moreover, a transition metal raw material may be selected from the group consisting of transition metals, and their oxides and hydroxides, but not limited thereto.

When a precursor that generates a gas during heat treatment, such as $Li_2CO_3$, $MnCO_3$, etc., is used as a reactant, pores are formed by the gas generated during the heat treatment, which results in an increase in specific surface area of the molded body, thus improving the adsorption efficiency.

In addition, the addition of the additive induces the formation of additional pores other than the internal pores formed by CO2, vapor, etc. generated from the reactant, thus increasing the specific surface area. Examples of the additive may include carbon powder, carbon nanotubes (CNT), polyethylene (PE), polypropylene (PP), etc.

The water glass used as a binder in the present invention is a concentrated aqueous solution obtained by dissolving silium dioxide and alkali metal. Sodium is mainly used as the alkali metal, and potassium may be used in some cases. The molecular formula of the water glass is $M_2O \cdot nSiO_2 \cdot xH_2O$, wherein M is an alkali metal such as Na, Li, K, etc. and $0.54 \leq n \leq 4$.

The water glass is an inorganic binder suitable for high-temperature heat treatment conditions and is used to facilitate the molding and to impart physical strength to the molded body after the molding. Moreover, while the alkali components may be dissolved in acid during the acid treatment of the molded body to prepare the ion-exchange adsorbent, the coupling between particles is maintained by $SiO_2$, a main component of the water glass, having high acid resistance, thus maintaining the strength after the acid treatment.

Moreover, the water glass contains water, and thus pores are formed by vapor generated during the heat treatment, which results in an increase in specific surface area of the molded body, thus improving the adsorption efficiency.

That is, the water glass plays important roles in increasing the specific surface area during the heat treatment and maintaining the strength after the acid treatment.

The water glass is added in an amount of 10 to 60 parts by weight with respect to 100 parts by weight of the mixture.

A porous lithium-manganese oxide molded body is prepared by mixing the reactant, the additive, and the water glass, extrusion-molding the mixture in the form of a cylinder, and heat-treating the resulting mixture.

Lithium-manganese oxides are synthesized by a solid-state reaction between the reactants during the heat treatment. In this process, pores are formed by gas generated by the decomposition of the reactants or additive or by the vapor generated from the water contained in the water glass. The synthesized lithium-manganese oxides are bound to each other by the water glass components, thus forming a molded body.

The heat treatment may be performed in a temperature range of 350 to 900° C. At a temperature below 350° C., the synthesis of the lithium-manganese oxides is difficult, and the strength of the molded body is low. At a temperature above 900° C., liquid phase sintering occurs due to the water glass components to increase the density, which reduces the specific surface area of the lithium-manganese oxide molded body and the volume of the pores, thus causing a reduction in the adsorption efficiency. The heat treatment may be performed within 2 to 48 hours.

The acid treatment is performed on the molded body to prepare an ion-exchange manganese oxide-based lithium adsorbent. During the acid treatment, lithium ions of the lithium-manganese oxide molded body are exchanged with hydrogen ions by the reaction in Reaction Scheme 1, and thus it is possible to prepare a lithium adsorbent that can selectively adsorb and desorb lithium ions dissolved in a target solution according to an ion-sieve effect, thus easily recovering lithium ions.

That is, the ion-exchange lithium-manganese oxide precursors of Chemical Formulas 1 to 6 are converted to ion-exchange manganese oxides of the following Chemical Formulas 1a to 6a, respectively, by the acid treatment, and the ion-exchange manganese oxides act as ion-sieves, thus adsorbing lithium ions by the ion-exchange method.

$$H_nMn_{2-x}O_4 \quad \text{[Chemical Formula 1a]}$$

wherein $1 \leq n \leq 1.33$, $0 \leq x \leq 0.33$, and $n \leq 1+x$임.

$$H_{1.33}Mn_{1.67}O_4 \quad \text{[Chemical Formula 2a]}$$

$$H_{1.6}Mn_{1.6}O_4 \quad \text{[Chemical Formula 3a]}$$

$$H_nMn_{2-x-y}M_yO_4 \quad \text{[Chemical Formula 4a]}$$

wherein $1 \leq n \leq 1.33$, $0 \leq x \leq 0.33$, $n \leq 1+x$, $0 < y < 1.67$, and M is a transition metal.

$$H_{1.33}Mn_{1.67-y}M_yO_4 \quad \text{[Chemical Formula 5a]}$$

wherein $0 < y < 1.67$ M is a transition metal.

$$H_{1.6}Mn_{1.6-y}M_yO_4 \quad \text{[Chemical Formula 6a]}$$

wherein $0 < y < 1.6$ M is a transition metal.

The acid treatment is performed in an acid solution of 0.01 to 3 M. The acidic solution used in the acid treatment is preferably a hydrochloric acid solution, but not particularly limited thereto. The acid treatment is performed within 5 to 160 hours.

While the alkali components in the water glass in the molded body may be dissolved in acid, the strength is maintained by silica having high acid resistance.

MODE FOR INVENTION

Hereinafter, the present invention will be described in more detail with reference to the Examples.

However, the following Examples are illustrative of the present invention only, and the present invention is not limited to the following Examples.

EXAMPLE 1

To prepare a lithium-manganese oxide molded body having a spinel structure, raw materials such as $Li_2CO_3$ and $Mn_2O_3$ were mixed in a molar ratio of 1.33:1.67 (Li/Mn) and fully and uniformly stirred in a stirrer for 30 minutes. Then, water glass was added to the mixture and uniformly mixed again, and the resulting mixture was extrusion-molded in the form of a cylinder having an external diameter of 3 mm and a length of 15 mm. The mixture in the form of a cylinder was dried and heat-treated (solid-state reaction) in an electric furnace at 500° C. for 2 hours (a) or 4 hours (b), thus preparing porous lithium-manganese oxide molded bodies in the form of a cylinder. It was observed by XRD analysis that the molded body in the form of a cylinder was a lithium-manganese oxide having a spinel structure (see FIG. 1).

EXAMPLE 2

A porous lithium-manganese oxide molded body in the form of a cylinder was prepared by the extrusion molding and the heat treatment according to the same method as Example 1, except that the reactant $Li_2CO_3$ was replaced with LiOH. As a result of the observation of the final product, it was observed that a lithium-manganese oxide having a spinel structure was prepared.

EXAMPLE 3

To prepare a lithium-manganese oxide molded body having a spinel structure, raw materials such as $Li_2CO_3$, $MnCO_3$, and $TiO_2$ were mixed in a molar ratio of 1:1.5:0.5 (Li/Mn/Ti) and fully and uniformly stirred in a stirrer for 30 minutes. Then, water glass was added to the mixture and uniformly mixed again, and the resulting mixture was extrusion-molded in the form of a cylinder having an external diameter of 3 mm and a length of 15 mm. The mixture in the form of a cylinder was dried and heat-treated (solid-state reaction) in an electric furnace at 500° C. for 2 hours, thus preparing a porous lithium-manganese oxide molded body in the form of a cylinder. It was observed by XRD analysis that the molded body in the form of a cylinder was a lithium-manganese oxide having a spinel structure.

EXAMPLE 4

A porous lithium-manganese oxide molded body in the form of a cylinder was prepared by the extrusion molding and the heat treatment according to the same method as Example 3, except that the reactant $TiO_2$ was replaced with FeOOH and $Li_2CO_3$, $MnCO_3$, and FeOOH were mixed in a molar ratio of 1:1.5:0.5 (Li/Mn/Fe). As a result of the observation of the final product, it was observed that a lithium-manganese oxide having a spinel structure was prepared.

EXAMPLE 5

A lithium adsorbent was prepared by preparing the porous lithium-manganese oxide in the form of a cylinder according to the process of Example 1 or Example 2, acid-treating the porous lithium-manganese oxide in a hydrochloric acid solution at a concentration of 0.3 M for 3 days, and washing and drying the resulting porous lithium-manganese oxide. As a result of the observation of the prepared lithium adsorbent, it was observed that the spinel crystal structure was well maintained even after topotactic extraction of lithium ions occurring after the acid treatment as shown in FIG. 2

In order to evaluate the adsorption efficiency of the adsorbent according to the present invention, the adsorption efficiencies of the lithium adsorbent molded body obtained in Example 5 and the lithium adsorbent in the form of powder were compared. As a result of the comparison of the equilibrium adsorption of lithium ions in an artificial seawater sample (Na $1.07\times10^4$ mg/L, Mg $1.3\times10^3$ mg/L, K $0.4\times10^3$ mg/L, Ca $0.4\times10^3$ mg/L, Cl $1.68\times10^4$ mg/L, and Li 0.2 mg/L), the adsorption capacity of the lithium adsorbent in the form of powder was 28.3 mg per 1 g of the adsorbent, and the adsorption capacity of the lithium adsorbent in the form of a cylinder prepared in Example 3 was 25.6 mg per 1 g of the adsorbent, from which it was confirmed that the adsorption capacity of the lithium adsorbent in the form of a cylinder maintained excellent adsorption performance, which was reduced by less than 10%.

Moreover, it was observed that the molded body in the form of a cylinder maintained the original shape and strength.

It will be apparent to those skilled in the art that various substitutions, modifications and changes may be made to the present invention without departing from the scope and spirit of the present invention, and thus the present invention is not limited by the foregoing Examples and drawings.

For example, although it has been described that the molded body is in the form of a cylinder, the adsorbent of the present invention may be molded into various shapes such as a spherical shape, a plate shape, etc.

The invention claimed is:

1. A method for preparing a porous manganese oxide-based lithium adsorbent, the method comprising the steps of:
    preparing a lithium-manganese oxide precursor molded body by preparing a mixture by adding an additive comprising at least one selected from the group consisting of carbon powder, carbon nanotubes (CNT), polyethylene (PE), and polypropylene (PP) to a lithium-manganese oxide precursor reactant, adding water glass to the mixture, and heat-treating the resulting mixture, wherein the water glass is added in an amount of 10 to 60 parts by weight with respect to 100 parts by weight of the mixture; and
    acid-treating the lithium-manganese oxide precursor molded body,
    wherein in the heat treatment, pores are formed in the lithium-manganese oxide precursor molded body by gas generated by decomposition of the lithium-manganese oxide precursor reactant or the water glass.

2. The method of claim 1, wherein the lithium-manganese oxide precursor is an ion-exchange precursor having a spinel structure of the following Chemical Formula 1:

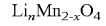 [Chemical Formula 1]

wherein 1≤n≤1.33, 0≤x≤0.33, and n≤1+x.

3. The method of claim 1, wherein the lithium-manganese oxide precursor is an ion-exchange precursor having a spinel structure of the following Chemical Formula 2:

$Li_{1.33}Mn_{1.67}O_4$ [Chemical Formula 2].

4. The method of claim 1, wherein the lithium-manganese oxide precursor is an ion-exchange precursor having a spinel structure of the following Chemical Formula 3:

$Li_{1.6}Mn_{1.6}O_4$ [Chemical Formula 3].

5. The method of claim 1, wherein the lithium-manganese oxide precursor is an ion-exchange precursor having a spinel structure of the following Chemical Formula 4:

$Li_nMn_{2-x-y}M_yO_4$ [Chemical Formula 4]

wherein $1 \leq n \leq 1.33$, $0 \leq x \leq 0.33$, $n \leq 1+x$, $0 < y < 1.67$, and M is a transition metal.

6. The method of claim 1, wherein the lithium-manganese oxide precursor is an ion-exchange precursor having a spinel structure of the following Chemical Formula 5:

$Li_{1.33}Mn_{1.67-y}M_yO_4$ [Chemical Formula 5]

wherein $0 < y < 1.67$ and M is a transition metal.

7. The method of claim 1, wherein the lithium-manganese oxide precursor is an ion-exchange precursor having a spinel structure of the following Chemical Formula 6:

$Li_{1.6}Mn_{1.6-y}M_yO_4$ [Chemical Formula 6]

wherein $0 < y < 1.6$ and M is a transition metal.

8. The method of claim 1, wherein the reactant comprises at least one selected from the group consisting of lithium carbonate, lithium hydroxide, lithium nitrate, lithium acetate, and combinations thereof and at least one selected from the group consisting of manganese, manganese oxide, manganese hydroxide, and combinations thereof.

9. The method of claim 1, wherein in the step of preparing the lithium-manganese oxide precursor molded body, the heat treatment is performed at 350 to 900° C. for 2 to 48 hours.

10. The method of claim 1, wherein the step of acid-treating the lithium-manganese oxide precursor molded body is performed in an acid solution of 0.01 to 3 M for 5 to 160 hours.

* * * * *